United States Patent [19]

Cherwin

[11] Patent Number: 4,794,715

[45] Date of Patent: Jan. 3, 1989

[54] MOTOR-DRIVEN MAP HOLDER

[76] Inventor: Charles Cherwin, 1027 Leneve Pl., El Cerrito, Calif. 94530

[21] Appl. No.: 705,673

[22] Filed: Feb. 26, 1985

[51] Int. Cl.⁴ .............................................. G09F 11/18
[52] U.S. Cl. ........................................ 40/514; 40/592; 40/593; 40/643
[58] Field of Search .......................... 40/514, 593, 10

[56] References Cited

U.S. PATENT DOCUMENTS

| | | | |
|---|---|---|---|
| 326,013 | 9/1885 | Brownlee | 40/514 |
| 430,902 | 6/1890 | Turner | 40/514 |
| 1,102,921 | 7/1914 | Hodges | 40/514 |
| 2,729,908 | 1/1956 | Miller | 40/10 A |
| 3,003,270 | 10/1961 | Palm | 40/593 |
| 3,293,785 | 12/1966 | Krei | 40/593 |
| 4,525,946 | 7/1985 | Olson | 40/514 |

Primary Examiner—Gene Mancene
Assistant Examiner—Wenceslao J. Contreras
Attorney, Agent, or Firm—Douglas A. Chaikin

[57] ABSTRACT

A roller-type map or shade holder is provided which is operated by an electric motor. In one embodiment, a simple drive clutch arrangement decouples the motor drive shaft from the map roller when the map is fully unwound or rewound.

6 Claims, 3 Drawing Sheets

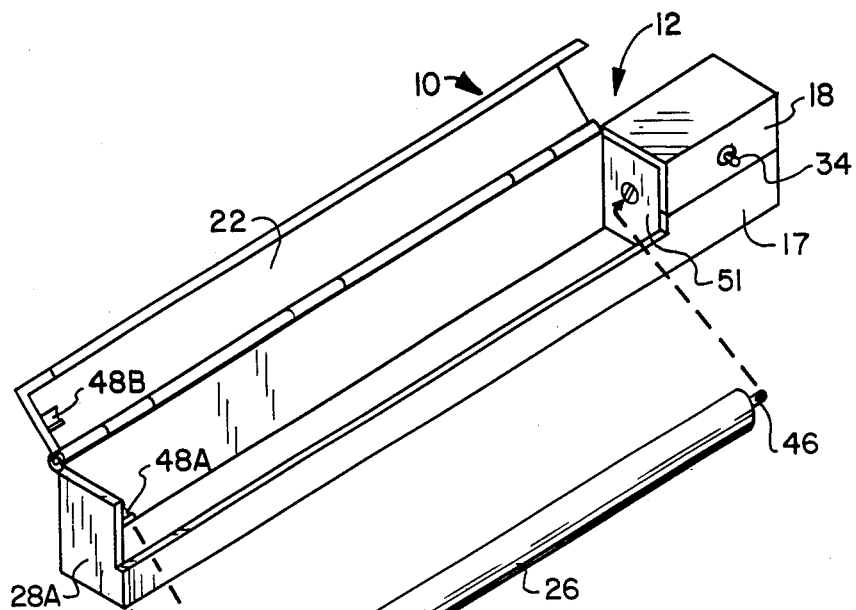
FIG. 2
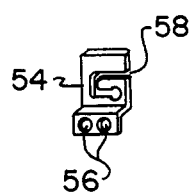
FIG. 4
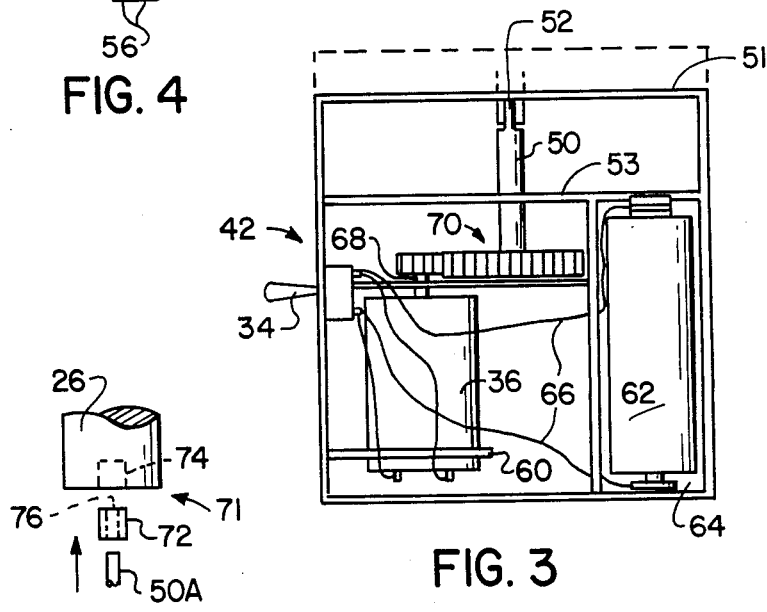
FIG. 3
FIG. 6

MOTOR-DRIVEN MAP HOLDER

BACKGROUND OF THE INVENTION

The present invention relates generally to roller-type map holders, which facilitate the storage and display of a map wound on the roller and, more particularly, to a compact, lightweight roller-type map holder which can be conveniently used in confined spaces and/or while traveling, such as in an automobile. In particular, the present invention relates to a roller-type map holder in which the roller and map are wound and unwound by a motor.

Typically, roller-type map holders either detachably or permanently mount a map on a roller. The roller, in turn, is mounted for rotation within a cylindrical or rectangular casing or housing. While such map holders may have no mechanized means for retracting the unwound roller/map, many if not most such map holders use spring rollers which are similar to those used in window shades. One example of such a roller is the spring and ratchet mechanism-controlled roller which is disclosed in Stout U.S. Pat. No. 1,723,820.

A number of approaches are also available for mounting the roller mechanism/map housing to a support surface such as the dash or windshield or sun visor of an automobile. For example, the housing may comprise or be mounted to a bracket which is fastened to an automobile dash, as by screws, as disclosed in Connors U.S. Pat. No. 1,065,295 and Richey U.S. Pat. No. 1,583,998. Alternatively, or in addition, resilient hooks or clips may be provided to temporarily attach the map housing to a windshield or sun visor, as disclosed in Vancil U.S. Pat. No. 1,570,104 and in Owen U.S. Pat. No. 2,188,612. Another approach, described in Hanks U.S. Pat. No. 1,588,106, uses resilient brackets or clips which are adapted both to fasten to a surface such as an automobile dash and to clip over an object such as a windshield.

As mentioned, the map can be permanently or detachably fastened or mounted to the roller. Relatively permanent fastening approaches include merely affixing the map to the roller, as by use of screws, or providing the map on or as part of a sleeve which is fastened to the roller by screws, as disclosed in Venard U.S. Pat. No. 1,364,223. Detachable fastening is provided, for example, by pointed spurs on the map roller as disclosed in the above-mentioned Vancil patent, or by the use of a map holding sheet which is attached to the roller and contains a pocket flap for holding the map. This latter approach is disclosed in the above-mentioned Richey patent. Alternatively, the map may have a tab or tongue which is removably wound into a longitudinal slot in the roller, as described in Seaquist U.S. Pat. No. 1,590,862 and in Hardt U.S. Pat. No. 2,180,146. Also, removable, unitary map-roller assemblies can be used. One such assembly is disclosed in the above-mentioned Stout patent.

It is one object of the present invention to provide a motor-driven roller-type map holder, in which a motor is used to unwind and rewind the roller-carried map. This approach is distinct from the window shade-type of spring roller used in the above-described patents, in which the shade or map is unwound manually and a coil spring effects rewinding.

It is another object of the present invention to provide a compact, completely self-contained roller-type map holder which has the advantage of being motor driven, but nonetheless is compact and lightweight and incorporates a relatively uncomplicated yet effective mounting arrangement for limiting the travel of the motor-driven map during winding and unwinding.

In one aspect, the map holder of the present invention includes a mounting frame in the form of a housing which supports and encloses a roller. The roller is mounted within the housing for rotation about a longitudinal axis and is adapted for fastening to a shade or map. Also mounted within the housing is a motor having a drive shaft which is operatively coupled to the roller for reversibly rotating the roller about its rotational axis to rewind and unwind the map.

In one preferred arrangement, both the motor and its energy source, in the form of batteries or a solar cell or solar cell(s), are contained within a compartment or compartments within the housing. Alternatively, in automotive-type applications, the motor can be direct wired to the vehicle's battery, particularly in OEM installations, or can be adapted to plug into the cigarette lighter.

In another preferred aspect, the housing is a unitary plastic structure and has a slot defined in one major face thereof, through which the shade or map extends and is wound and unwound. The slot is defined by a hinged door which provides access to the interior of the housing.

In another aspect, the motor drive shaft is operatively connected to the roller by a friction coupling so that, upon reaching a predetermined rotational torque, as when the map is unwound or fully rewound, the roller is decoupled from rotation with the motor. This prevents the application of excess stress to the map and the possibility of pulling the map loose from its mounting. The result of the various aspects described above is a motor-driven map holder which is compact, lightweight and convenient to use.

The above and other aspects of the present invention are discussed in greater detail in conjunction with the attached drawings, in which:

FIG. 2 is a perspective view in the manner of FIG. 1, with the housing cover open and illustrating a removable roller mounting arrangement;

FIG. 3 is an enlarged cross-sectional view of the motor compartment taken along the lines 3—3 in FIG. 1 illustrating in phantom the battery positions within the motor compartment;

FIG. 4 illustrates an alternative mounting bracket for the roller;

FIG. 5 is a partial perspective view, somewhat enlarged, taken generally in the direction of the arrows 5—5 in FIG. 1, that is, viewed from the opposite, motor compartment end of the housing or case;

FIG. 5A is a partial perspective view, similar to FIG. 5, showing alternative battery and switch positions;

FIG. 6 illustrates an alternative, clutch drive arrangement; and

DETAILED DESCRIPTION OF THE PREFERRED EMBODIMENT

Figure 1:
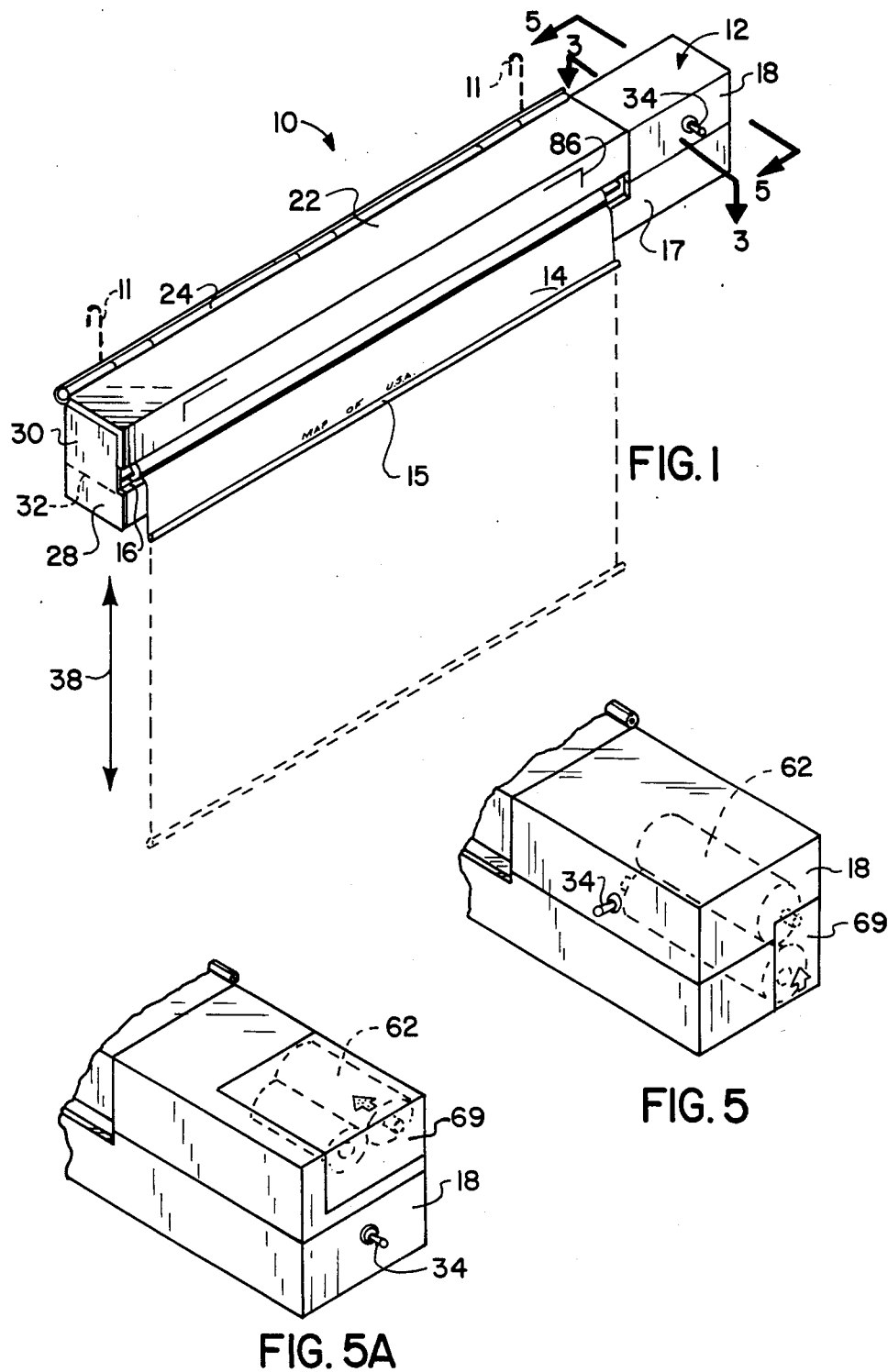
FIG. 1 is a perspective view of one embodiment of the map holder of the present invention with the housing cover closed.

Referring to FIG. 1, there is shown a perspective view of one embodiment 10 of the holder of the present invention. While the illustrative use of the holder 10 is as a map holder or shade holder in automobiles or other vehicles, the holder is applicable in general wherever a compact, lightweight, easy-to-use, self-contained map or shade holder would be useful. Keeping this versatility in mind, for simplicity reference here is primarily to an automobile map holder. The map holder 10 comprises an elongated housing 12 which typically is square or rectangular in cross-section. The housing 12 is adapted, as discussed below, for mounting, winding and unwinding a shade or map 14. The map is provided with a weight such as bar 15 which can also act as a stop. Weight 15 facilitates use and smooth operation of the map. Typically, the housing 12 is permanently mounted by screws (not shown) to a dash or wall or other suitable surface or is removably attached to the dash or other surface by adhesive or Velcro, or is removably mounted to the windshield, window, sun visor or other surface by resilient clips such as those shown in phantom at 11 in FIG. 1. The housing 12 can be constructed using various techniques and materials. One such preferred technique and material is molded plastic, which provides a lightweight durable construction. An axial slot 16 is formed in the front face 17 of the housing 12 and extends along substantially the length of the housing except at end 18 which houses the motor compartment.

In the illustrated embodiment 10, the housing 12 also includes an access door 22 which is mounted to the body of the housing 12 by hinge 24. The hinge can be an ordinary metal hinge such as a piano hinge, or can be a reduced thickness section of the housing material where the housing is constructed of flexible material such as plastic. Optionally, where the map 14 or roller 26 (FIG. 2) is removed from the housing via the end thereof, that end 28 is provided with a second door 30 which can be mounted to the housing end of by a hinge 32 of the same type as the hinge 24. FIG. 1 also illustrates a three-position switch 34 which controls the reversible on and off operation of the motor (36, FIG. 3) for winding and unwinding the map 14 along the reversible path indicated by the arrow 38.

Referring now to FIGS. 2 and 3, there is shown one embodiment of a mounting arrangement for the map roller 26. It should be noted that to facilitate understanding of FIG. 2, the roller 26 is shown removed from the housing 12 and is shown without an attached map. In the particular illustrated arrangement, the housing 10 is adapted to permit insertion of the roller 26 from the housing front side 17 and therefore the housing end 28A need not contain the optional door 30, FIG. 1.

As shown by FIG. 2 and the view of the motor compartment 42 shown at FIG. 3, the roller 26 has a first shaft 44 extending from one end and a second, slotted drive shaft 46 extending from the opposite end, substantially coincident with the rotational axis of the roller. The first shaft is mounted between a pair of mating semicylindrical sleeves 48A, 48B which are fastened or otherwise formed in the housing end 28A and the door 22 and which form a cooperative bearing-surface holder for the shaft 44 when the door is closed. Slotted shaft 46 is adapted for mounting and for being rotated by a mating drive shaft 50 which extends from the housing compartment 42. Referring specifically to FIG. 3, the drive shaft 50 extends through and is supported by walls 51 and 53 which separate the motor compartment 42 from the roller compartment. The drive shaft 50 has a bar 52 formed in outer end thereof for coupling to and rotatably driving the slotted roller shaft 46. To insert the roller 26 into the embodiment of the housing 10 shown in FIG. 2, the shaft 46 is first inserted onto drive shaft 50, then shaft 44 is placed on sleeve 48A and the door 22 is closed to retain the shaft 44 within the sleeve pair 48A-48B.

Alternatively, the sleeve pair 48A-48B can be replaced by a mounting structure such as the bracket 54 which is shown in FIG. 4. Bracket 54 is mounted to the housing end 28A, by screws (not shown) via holes 56-56. The bracket 54 contains a slotted aperture 58 which permits easy insertion and removal of the roller shaft 44, yet retains the shaft during normal operation of the roller.

Referring further to the motor compartment 42 shown in FIG. 3, in a preferred embodiment, the motor 36 is mounted by means such as bracket 60 within the compartment 42 at end 18 of the housing 12. The bracket 60 and the roller shaft mounting bracket or the gear reduction unit mounting bracket can be provided with through-holes through the housing 12 for mounting the housing by screws to the dash or other surface. An energy source such as one or more batteries 62 is held within a subsection 64 of the motor compartment 42 and is connected to the motor 36 and to the three-position forward/off/reverse motor 36 by wires 66-66. To enhance the available torque, the motor shaft 68 is coupled to the roller drive shaft 50 by a simple gear reduction unit 70 which comprises relatively small diameter and relatively large diameter gears on the motor drive shaft 68 and the roller drive shaft 50, respectively. With this drive arrangement, when the switch is moved from an off position to one of the operational positions, or from one operational "on" position to the other, the motor 36 is energized to rotate the drive shaft 50 and roller 26 clockwise or counterclockwise (FIG. 3) to unwind the map downwardly as shown in FIG. 1 or to rewind the map upwardly in FIG. 1.

As shown in FIG. 5, the batteries 62 can be conveniently inserted and removed via a third door 69 which typically is a conventional sliding, pressure fit type of door such as is used in radios, calculators, etc. In automotive or other vehicular applications, the motor can be direct wired to the vehicle's battery or can be adapted to plug into the cigarette lighter. Optionally, the chemical battery 62 can be replaced by a solar cell/storage unit. In this embodiment, an appropriate section of the housing 12 adjacent the solar cell unit would be open or optically transparent.

FIG. 5A shows an alternative housing construction in which the battery compartment is on top rather than at the rear, and the switch 34 is at the end 18 of the housing.

Referring to FIG. 6, there is shown an alternative, presently preferred simple low cost clutch arrangement 71 for driving the roller 26. The clutch includes a coupling cylinder 72 having a serrated or otherwise roughened (or adhesive), frictional outer surface which fits within a bore 74 in the end of roller 26. (In the embodiment of FIG. 6, the bore 74 replaces shaft 46 of FIG. 2.) The coupling cylinder 72 itself has a bore 76 formed therein for receiving the drive shaft 50A of the motor 36. The bore 76 is of relatively small diameter to provide a friction fit with the shaft 50A which is overcome at a relatively low rotational torque. Thus, when the motor 36 is operated to unwind or rewind the map 14, upon reaching a predetermined rotational torque level, as when the map is fully unwound or fully rewound, the drive shaft 50A is effectively decoupled from coupling cylinder 72 to prevent further rotation of the roller 26 and damage to the motor or map or other system components.

Figure 7:
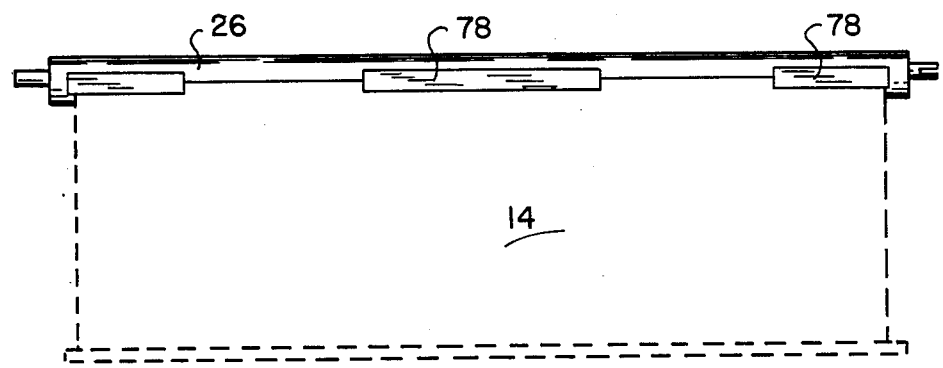
FIGS. 7-9 illustrate alternative arrangements for removably mounting a map to the roller used in the present invention.
Figure 8:
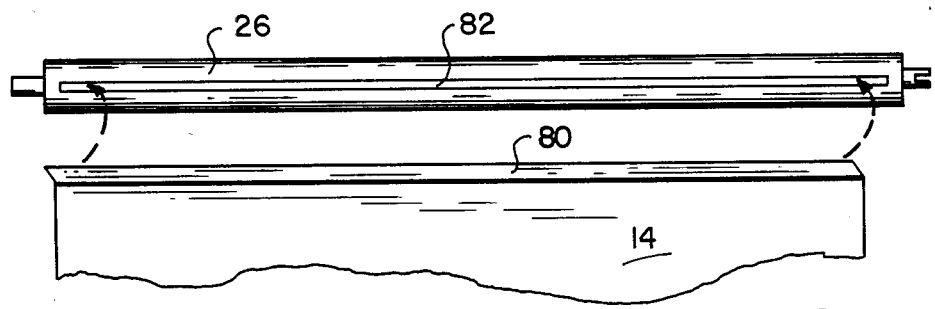

While it will be appreciated that the map or shade 14 could be permanently mounted to the roller 26, for example, as described in the above-mentioned Venard U.S. Pat. No. 1,364,223, nonetheless detachable fastening of the map is preferred to facilitate the use of different maps and/or replacing the map with a sunshade or vice versa. For example, as shown in FIG. 7, the map 14 can be attached to the roller 26 by tape 78 or reusable adhesive or Velcro. Alternatively, as shown in FIG. 8, the map can have an enlarged inner end 80 which is inserted into mating slot 82 is roller 26 and is held therein by compression, or reusable adhesive such as that used in scotch "Post-Ems" by 3M Corporation, but is easily removable.

Figure 9:
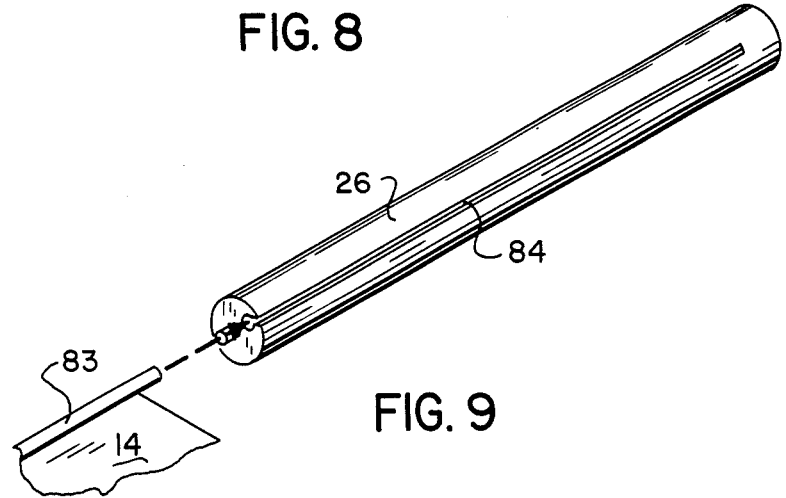

In still another alternative detachable map mounting arrangement, shown in FIG. 9, the map 14 has an enlarged end 83 or a stiffening rod attached thereto which slides axially into and out of a mating slot 84 in the roller 26. In this embodiment, of course, the insertion and removal of the map is facilitated by door 30, FIG. 1. When this type of axially-insertable map mounting is used in conjunction with a suitable axially-insertable roller mounting such as, for shaft 44, a simple bearing orifice in door 28A (or even bracket 54, FIG. 4) and, for shaft 46, the slotted coupling of FIG. 2, or clutch arrangement of FIG. 6, both the roller 26 and map 14 are axially insertable and removable. Door 22 then need not be used. This facilitates construction of the housing 12 and mounting of mirror 86 (FIG. 1) to the housing. Of course, various other detachable mounting arrangements can be used such as the tab and slot arrangement described in previously mentioned Seaquist U.S. Pat. No. 1,590,862 and Hardt U.S. Pat. No. 2,180,146.

Those of skill in the art will readily modify and adapt the above-described motor-driven map holder to other uses in addition to, and/or which include, the described map/shade features. For example, resilient clips and other mounting means may be attached to the housing, for example, as described in several of the above first-mentioned patents to attach the holder 10 to a windshield, window, sun visor, dash or other surface in an automobile or elsewhere. Also the housing 12 can support or be part of an automobile rearview mirror. For example, the map housing 12 can be mounted in the normal rearview mirror mounting position in an automobile or other vehicle and the slit 16 moved to the bottom of the housing 12 so that a rearview mirror can be attached to the front surface 17 of the housing as indicated in phantom at 86 in FIG. 1. In this case, the map holder becomes the rear view mirror. In addition, while automotive applications have been described, the invention is simarily applicable to farm implements, boats, aircraft and other usages including in the home and office. Of course, those skilled in the art will derive other applications and modifications of the present invention which are within the spirit and scope of the invention as defined herein and by the following claims.

Having thus described a preferred and alternate embodiments of the present invention, what is claimed is:

1. A self-contained motor-driven housing for mounting and rotating a map or other sheet-like article, comprising:
    a roller for mounting the article;
    a substantially enclosed housing supporting the roller within the housing for rotation about the longitudinal axis thereof, said housing having an axial opening for permitting unwinding and rewinding of the article therethrough; and
    a motor, powered by use of a battery mounted within the housing and being operatively coupled to the roller for reversibly rotating the roller about said longitudinal axis to wind and unwind the article.

2. The motor-driven holder of claim 1 wherein the motor comprises a drive shaft which is operatively connected to the roller by a friction coupling so that upon reaching a predetermined rotational torque level, as when the article is unwound or fully rewound, the roller is decoupled from rotation with the motor.

3. The motor-driven map holder of claim 2 wherein the motor is battery powered.

4. The motor-driven map holder of claim 2 wherein the motor is powered by one or more solar cells.

5. A motor-driven holder for a map or other sheet-like article, comprising:
    a roller for mounting the map;
    a substantially enclosed housing having first and second ends and having a door formed at one end thereof, said door having mounting means for supporting the roller for rotation about the longitudinal axis thereof, said housing also having an axial opening for permitting unwinding and rewinding of the map therethrough;
    said housing further including a motor located in the second end thereof, said motor comprising a drive shaft which is operatively connected to the roller by friction coupling and being operatively coupled to and mounting the second end of the roller for reversibly rotating the roller about the longitudinal axis to unwind and rewind the map, so that upon reaching a predetermined rotational torque level, as when the map is fully rewound and unwound, the roller is decoupled from rotation with the motor; and wherein
    the housing further comprises means for mounting a power source within the housing and coupling the power source to the motor to rotate the motor.

6. A motor-driven holder for a map or other sheet-like article, comprising:
    a roller for mounting the map;
    a substantially enclosed housing having first and second ends and having first door formed at one end thereof, said door having mounting means for supporting the roller for rotation about the longitudinal axis thereof, said housing also having an axial opening for permitting unwinding and rewinding of the map therethrough and having a second door formed generally to extend along the longitudinal axis of the roller for providing access to the roller and defining the slit in said housing when closed;
    said housing further including a motor located in the second end thereof, said motor and being operatively coupled to and mounting the second end of the roller for reversibly rotating the roller about the longitudinal axis to unwind and rewind the map; and wherein
    the housing further comprises means for mounting a power source within the housing and coupling the power source to the motor to rotate the motor.

* * * * *